US008921507B2

(12) United States Patent
Yoshihara et al.

(10) Patent No.: US 8,921,507 B2
(45) Date of Patent: Dec. 30, 2014

(54) THERMOPLASTIC RESIN WITH HIGH THERMAL CONDUCTIVITY

(75) Inventors: Shusuke Yoshihara, Osaka (JP); Toshiaki Ezaki, Osaka (JP); Kazuaki Matsumoto, Osaka (JP)

(73) Assignee: Kaneka Corporation, Osaka (JP)

( * ) Notice: Subject to any disclaimer, the term of this patent is extended or adjusted under 35 U.S.C. 154(b) by 14 days.

(21) Appl. No.: 13/641,964

(22) PCT Filed: Apr. 14, 2011

(86) PCT No.: PCT/JP2011/002208
§ 371 (c)(1),
(2), (4) Date: Oct. 18, 2012

(87) PCT Pub. No.: WO2011/132389
PCT Pub. Date: Oct. 27, 2011

(65) Prior Publication Data
US 2013/0043425 A1 Feb. 21, 2013

(30) Foreign Application Priority Data

Apr. 19, 2010 (JP) ................................. 2010-096053

(51) Int. Cl.
C08G 63/16 (2006.01)
C09K 5/00 (2006.01)

(52) U.S. Cl.
USPC ........... 528/193; 528/194; 528/301; 528/271; 528/308; 252/76; 252/79

(58) Field of Classification Search
USPC ............ 528/193, 194, 271, 301, 308; 252/76, 252/79
See application file for complete search history.

(56) References Cited

U.S. PATENT DOCUMENTS

| 3,576,903 | A | 4/1971 | Groff |
| 3,880,946 | A | 4/1975 | Labana et al. |
| 3,880,947 | A | 4/1975 | Labana et al. |
| 4,539,386 | A | 9/1985 | Yoon |
| 4,837,407 | A | 6/1989 | Nezu |
| 4,904,752 | A | 2/1990 | Kanoe et al. |
| 4,904,757 | A | 2/1990 | Coassolo et al. |
| 5,068,052 | A | 11/1991 | Watanabe et al. |
| 5,138,022 | A | 8/1992 | Mang et al. |
| 5,258,134 | A | 11/1993 | Yoshinaga et al. |
| 5,306,806 | A | 4/1994 | Tanabe et al. |
| 6,261,481 | B1 * | 7/2001 | Akatsuka et al. ............ 252/567 |
| 6,369,157 | B1 | 4/2002 | Winckler et al. |
| 6,680,002 | B2 | 1/2004 | Yamauchi et al. |
| 6,784,260 | B2 | 8/2004 | Yeager et al. |
| 7,056,988 | B2 | 6/2006 | Yao |
| 7,109,288 | B2 | 9/2006 | Akatsuka et al. |
| 2001/0049430 | A1 | 12/2001 | Winckler et al. |
| 2003/0094725 | A1 | 5/2003 | Yao |
| 2003/0168634 | A1 | 9/2003 | Yamauchi et al. |
| 2004/0147709 | A1 | 7/2004 | Akatsuka et al. |
| 2004/0224163 | A1 | 11/2004 | Tobita et al. |
| 2006/0276568 | A1 | 12/2006 | Akatsuka et al. |
| 2008/0242772 | A1 | 10/2008 | Nakamura et al. |
| 2009/0091045 | A1 | 4/2009 | Tanikawa et al. |
| 2010/0016498 | A1 | 1/2010 | Kaji et al. |
| 2010/0080997 | A1 | 4/2010 | Seki et al. |
| 2011/0204282 | A1 | 8/2011 | Yoshihara et al. |
| 2012/0175549 | A1 | 7/2012 | Yoshihara et al. |

FOREIGN PATENT DOCUMENTS

| DE | 4226994 A1 | 2/1994 |
| EP | 0612802 A1 | 8/1994 |
| JP | 50-92930 A | 7/1975 |
| JP | 57-133124 A | 8/1982 |
| JP | 60-40127 A | 3/1985 |
| JP | 61-296068 A | 12/1986 |
| JP | 63-125521 A | 5/1988 |
| JP | 63-264828 A | 11/1988 |
| JP | 1-149303 A | 6/1989 |
| JP | 02-005307 A | 1/1990 |
| JP | 02-028352 A | 1/1990 |
| JP | 02-127438 A | 5/1990 |
| JP | 6-298928 A | 10/1994 |
| JP | 06-298928 A | 10/1994 |
| JP | 08-143653 A | 6/1996 |
| JP | 2000-80257 A | 3/2000 |
| JP | 2002-284864 A | 10/2002 |
| JP | 2002-371129 A | 12/2002 |
| JP | 2003-246923 A | 9/2003 |
| JP | 2003-268070 A | 9/2003 |
| JP | 2007-224060 A | 9/2007 |
| JP | 2008-150525 A | 7/2008 |
| JP | 2008-169265 A | 7/2008 |

(Continued)

OTHER PUBLICATIONS

U.S. Office Action dated Jan. 22, 2014, issued in related U.S. Appl. No. 13/126,246, (17 pages).
W-F. A. Su, "Thermoplastic and Thermoset Main Chain Liquid Crystal Polymers Prepared from Biphenyl Mesogen", Journal of Polymer Science: Part A: Polymer Chemistry, vol. 31, (1993), pp. 3251-3256.
U.S. Office Action dated Jan. 22, 2014, issued in related U.S. Appl. No. 13/126,346.
Maeda Y. et al., "High-pressure DTA study on liquid crystalline polyesters with biphenyl as mesogen", Thermochimica Acta, 266, (1995), pp. 189-202, cited in U.S. Office Action dated Jan. 22, 2014, issued in related U.S. Appl. No. 13/126,246.

(Continued)

Primary Examiner — Robert D. Harlan
(74) Attorney, Agent, or Firm — Westerman, Hattori, Daniels & Adrian, LLP

(57) ABSTRACT

Provided is a thermoplastic resin which (A) remarkably improves thermal conductivity of a resin composition when a thermally conductive filler is added and (B) can be injection-molded even by use of a general injection-molding die.

The thermoplastic resin is a resin wherein: a main chain which mainly has a specific repeating unit; and 60 mol % or more ends of molecular chains are carboxyl groups.

13 Claims, No Drawings

(56) References Cited

FOREIGN PATENT DOCUMENTS

| JP | 04-249528 A | 4/2009 |
|---|---|---|
| JP | 2009-91440 A | 4/2009 |
| JP | 2010-37474 A | 2/2010 |
| JP | 2010-037474 A | 2/2010 |
| JP | 2010-150377 A | 7/2010 |
| JP | 2011-52204 A | 3/2011 |
| JP | 2011-63790 A | 3/2011 |
| JP | 2011-063790 A | 3/2011 |
| JP | 2011-084714 A | 4/2011 |
| JP | 2011-84714 A | 4/2011 |
| JP | 2011-84715 A | 4/2011 |
| JP | 2011-084715 A | 4/2011 |
| JP | 2011-084716 A | 4/2011 |
| JP | 2011-84716 A | 4/2011 |
| WO | 02/094905 A1 | 11/2002 |
| WO | 2006/120993 A1 | 11/2006 |
| WO | 2010/050202 A1 | 5/2010 |
| WO | 2011/033815 A1 | 3/2011 |

OTHER PUBLICATIONS

CAPlus abstract of Paci "Calorimetric Study of Blends of Ploy(Butylene Terephthalate) and a Liquid Crystalline Polyester", Journal of Polymer Science: Part B: Polymer Physics, vol. 285, (1987) pp. 1595-1605) and a Registry entry for RN 70800-12-3, (4 pages), cited in U.S. Office Action dated Jan. 8, 2014 issued in related U.S. Appl. No. 13/395,914.

U.S. Office Action dated Jan. 8, 2014, issued in related U.S. Appl. No. 13/395,914, 19 pages).

Paci et al., "Calorimetric Study of Blends of Poly(Butylene Terephathalate) and a Liquid Crystalline Polyester", Journal of Polymer Science: Part B: Polymer Physics, vol. 25, (1987), pp. 1595-1605, cited in U.S. Office Action dated Jan. 8, 2014 issued in related U.S. Appl. No. 13/395,914.

International Search Report of PCT/JP2010/057390, mailing date Jul. 13, 2010.

Notification of Transmittal of Translation of the International Preliminary Report on Patentability (Form PCT/IB/338) of International Application No. PCT/JP2010/057390 mailed Apr. 19, 2012 with Forms PCT/IB/373 and PCT/ISA/237.

C. L. Choy, et al, "Thermal conductivity of highly oriented polyethylene", Polymer, Feb. 1978, pp. 155-162, vol. 19.

Kurt Geibel, et al, "In Situ Photoppolymerized, Oriented Liquid-Crystalline Diacrylates with Hight Thermal Conductivities", Advanced Materials, 1993, pp. 107-109, vol. 5, No. 2.

International Search Report of PCT/JP2009/005700, mail date of Jan. 19, 2010.

Masatoshi Tokita, et al., "Chain-Folded Lamellar Structure in the Smectic H Phaseof a Main-Chain Polyester", Macromolecules, 1998, pp. 8590-8594, vol. 31.

Notification of Transmittal of Translation of the International Preliminary Report on Patentability ( Form PCT/IB/338) of International Application No. PCT/JP2009/005700 mailed Jul. 7, 2011 with Form PCT/IPEA/409.

International Search Report of PCT/JP2011/002212, date of mailing Jul. 19, 2011.

Asrar, J et al., "Thermotropic Homopolyesters. I. The Preparation and Properties of Polymers Based on 4, 4'-Dihydroxybiphenyl", Journal of Polymer Science: Polymer Physics Edition, vol. 21, p. 1119-1131 (1983).

Krigbaum, W.R. et al., "Thermotropic homopolyesters: 5. Investigation of the smectic phase of polyesters based on p,p'-bibenzoic acid", Polymer, vol. 24, p. 1299-1307, Oct. 1983.

Van Luyen, D., et al., "Influence De La Structure Sur Les Proprietes Mesomorphes Des Polyesters—II", w/ English abstract, European Polymer Journal, vol. 16, p. 303-306 (1980).

Maret, G. et al., "Orientation of Thermotropic Liquid-Crystalline Polyesters in High Magnetic Fields", Mol. Cryst. Liq. Cryst., vol. 88, pp. 295-309 (1982).

Martinez-Gomez, A. et al., "Effect of the intercalated/exfoliated nanostructure on the phase transformations of smectic polyester/layered silicate hybrids: Reinforcement of the liquid-crystalline matrix", Polymer, vol. 50, No. 6, p. 1447-1455 (2009).

Yoshihara, S. et al., "Enhanced Thermal Conductivity of Thermoplastics by Lamellar Crystal Alignment of Polymer Matrices", Macromolecular Chemistry and Physics, p. 1-7, Aug. 30, 2012.

Yoshihara, S. et al., "Lamellar Crystal Alignment of Main Chain Liquid Crystal Polyester and Thermal Conductivity", p. 1, May 15, 2012.

Yoshihara, S. et al., "New Thermally Conductive Thermoplastic Liquid Crystal Polyester", p. 1-2, Aug. 29, 2012.

Notification of Transmittal of Translation of the International Preliminary Report on Patentability (Form PCT/IB/338) of International Patent Application No. PCT/JP2011/002212, dated Nov. 15, 2012, with Forms PCT/IB/373 and PCT/ISA/237.

Notification of Transmittal of Translation of the International Preliminary Report on Patentability (Form PCT/IB/338) of International Patent Application No. PCT/JP2011/002208, dated Nov. 15, 2012, with Forms PCT/IB/373 and PCT/ISA/237.

International Search Report of PCT/JP2011/002208, dated Jul. 26, 2011.

Watanabe, et al., "Crystalline and Liquid Crystal Transitions of Mesogenic Polymer Mixtures and Random Copolymers", Macromolecules, dated 1984, vol. 17, (pp. 2288-2295).

Scaffaro, R. et al., "Effects of Filler Type and Mixing Method on the Physical Properties of a Reinforced Semirigid Liquid Crystal Polymer", Eur. Polym. J., vol. 32, No. 7, p. 869-875, 1996; in US Office Action dated Jun. 10, 2013.

US Office Action dated Jun. 10, 2013, issued in U.S. Appl. No. 13/126,246.

US Office Action dated Oct. 12, 2012, issued in U.S. Appl. No. 13/126,246.

US Notice of Allowance dated May 13, 2013, issued in U.S. Appl. No. 13/641,939.

US Office Action dated May 8, 2013, issued in U.S. Appl. No. 13/395,914.

U.S. Office Action (Restriction Requirement) dated Mar. 11, 2013, issued in related U.S. Appl. No. 13/395,914 (9 pages).

Chinese Office Action dated Oct. 10, 2013, issued in Chinese Patent Application No. 201180019698.6 (5 pages).

Chinese Office Action dated Oct. 10, 2013, issued in corresponding Chinese Patent Application No. 201180019737.2 (5 pages).

U.S. Advisory Action dated Nov. 8, 2013, issued in copending U.S. Appl. No. 13/126,246 (3 pages).

International Search Report of PCT/JP2011/002208, dated Jul. 26, 2011. With English Translation.

Krigbaum, et al., "Thermotropic homopolyesters: 5. Investigation of the smectic phase of polyesters based on p, p'-bibenzoic acid", Polymer, dated Oct. 1983, vol. 24, (pp. 1299-1307).

Van Luyen, et al., "Influence de la structure sur les proprietes mesomorphes des polyesters—II", European Polymer Journal, dated 1980, vol. 16, (pp. 303-306). With English Abstract.

Maret, et al., "Orientation of Thermotropic Liquid-Crystalline Polyesters in High Magnetic Fields", Mol. Cryst. Liq. Cryst, dated 1982, vol. 88, (pp. 295-309).

Asrar, et al., "Thermotropic Homopolyesters. I. The Preparation and Properties of Polymers Based on 4,4'-Dihydroxybiphenyl", Journal of Polymer Science: Polymer Physics Edition, dated 1983, vol. 21, No. 7, (pp. 1119-1131).

Yoshihara et al., "Enhanced Thermal Conductivity of Thermoplastics by Lamellar Crystal Alignment of Polymer Matrices", Macromol. Chem. Phys. 10:1002/maccp.201200317, dated Aug. 30, 2012, (pp. 1-7).

Yoshihara, et al., "Lamellar Crystal Alignment of Main Chain Liquid Crystal Polyester and Thermal Conductivity", dated May 15, 2012, (1 page).

Yoshihara, et al., "New Thermally Conductive Thermoplastic Liquid Crystal Polyester", dated Aug. 29, 2012, (2 pages).

W-F. A. Su, "Thermoplastic and Thermoset Mian Chain Liquid Crystal Polymers Prepared from Biphenyl Mesogen", Journal of Polymer Science: Part A: Polymer Chemistry, vol. 31, (1993), pp. 3251-3256, U.S. Office Action dated Jan. 22, 2014, issued in related U.S. Appl. No. 13/126,246.

(56) References Cited

OTHER PUBLICATIONS

CAPlus abstract of Paci "Calorimetric Study of Blends of Poly(Butylene Terephthalate) and a Liquid Crystalline Polyester", Journal of Polymer Science: Part B: Polymer Physics, vol. 25, (1987) pp. 1595-1605) and a Registry entry for RN 70800-12-3, (4 pages), cited in U.S. Office Action dated Jan. 8, 2014 issued in related U.S. Appl. No. 13/395,914.

Paci et al., "Calorimetric Study of Blends of Poly(Butylene Terephthalate) and a Liquid Crystalline Polyester", Journal of Polymer Science: Part B: Polymer Physics, vol. 25, (1987), pp. 1595-1605, cited in U.S. Office Action dated Jan. 8, 2014 issued in related U.S. Appl. No. 13/395,914.

Japanese Office Action dated Mar. 18, 2014, issued in corresponding Japanese Application No. 2012-511536 (3 pages).

Japanese Office Action dated Mar. 18, 2014, issued in corresponding Japanese Patent Application No. 2012-511535 (4 pages).

U.S. Final Office Action dated Jun. 19, 2014, issued in related U.S. Appl. No. 13/126,246 (18 pages).

Japanese Office Action dated Jun. 3, 2014, issued in Japanese Patent Application No. 2011-531816 with English translation (10 pages) (this document is corresponding to U.S. Appl. No. 13/395,914).

U.S. Final Office Action dated Jun. 4, 2014, issued in related U.S. Appl. No. 13/395,914 (23 pages).

US Advisory Action dated Aug. 21, 2014, issued in corresponding U.S. Appl. No. 13/395,914, (7 pages).

\* cited by examiner

THERMOPLASTIC RESIN WITH HIGH THERMAL CONDUCTIVITY

The present invention relates to a thermoplastic resin itself which has excellent thermal conductivity and can be injection-molded.

TECHNICAL FIELD

In a case where a thermoplastic resin composition is used for various applications such as housings of a personal computer and a display device, an electronic device material, and automotive exterior and interior parts, there sometimes occurs a problem that it is difficult to release generated heat because a plastic is less thermally conductive than an inorganic substance such as a metal material. In order to solve the problem, an attempt has been extensively made to obtain a thermally conductive filler by adding, with a thermoplastic resin, a highly thermally conductive filler in a large amount. In order to obtain a thermally conductive filler, it is necessary to add, to a resin, a thermally conductive filler such as graphite, carbon fiber, alumina, or boron nitride generally in an amount of not less than 30 vol %, and further in a high amount, i.e., in an amount of not less than 50 vol %. However, thermal conductivity of a resin composition is limited even if a large amount of filler is added to a resin because the resin itself has low thermal conductivity. In view of the circumstances, improvement in thermal conductivity of a resin itself is demanded.

Patent Literature 1 discloses an epoxy resin and Patent Literature 2 discloses a bismaleimido resin as a thermosetting resin itself having excellent thermal conductivity. Each of the resins is thermally conductive to some extent, whereas it is difficult to produce the resin because the resin has a complicated molecular structure. Patent Literature 3 discloses an epoxy resin which is synthesized with relative ease, however, does not have enough thermal conductivity.

A thermoplastic resin is exemplified by a resin molded product described in Patent Literature 4. The resin molded product is obtained as follows: thermal liquid crystal polyester is oriented by at least one external field selected from a flow field, a shear field, a magnetic field, and an electric field, so as to cause the thermal liquid crystal polyester to be highly thermally conductive in a direction in which the thermal liquid crystal polyester is oriented. The resin molded product is highly thermally conductive in one axis direction but less thermally conductive in the other two axis directions. In addition, in the case of the magnetic field, at least 3 teslas of magnetic flux density is required to obtain a desired thermal conductivity. This makes it difficult to produce the resin molded product.

There have been no other examples of research report on a thermoplastic resin which is not subjected to a special molding process such as extension or magnetic field orientation and in which resin itself is highly thermally conductive. As for a liquid crystalline thermoplastic resin, Non Patent Literatures 1 to 4 describe alternating polycondensation products, showing liquid crystal phases, which are formed from mesogenic groups and alkyl chains.

However, because a ratio of carboxyl groups to ends of each resin is about 50 mol %, thermal conductivity of the resin composition is less likely to improve when another filler is added. It is deduced that this is caused by a thermal resistance generated at a contact interface between a resin and a filler. Further, each of the Non Patent Literatures 1 to 4 does not disclose thermal conductivity of a resin itself nor adding of another filler.

Further, Patent Literature 5 discloses, as an example of thermal liquid crystal polyester having molecular chains whose ends could be carboxyl groups, aromatic polyester having a specific component which can be obtained by carrying out polymerization by use of the excessive number of aromatic dicarboxylic acid monomers. However, each liquid crystal polyester has low crystallinity because of its molecular structure, so that a resulting resin itself has low thermal conductivity.

CITATION LIST

Patent Literatures
Patent Literature 1
International Publication WO 2002/094905
Patent Literature 2
Japanese Patent Application Publication, Tokukai, No. 2007-224060 A
Patent Literature 3
International Publication WO 2006/120993
Patent Literature 4
Japanese Patent Application Publication, Tokukai, No. 2008-150525 A
Patent Literature 5
Japanese Patent Application Publication, Tokukaisho, No. 60-40127 A

NON PATENT LITERATURES

Non Patent Literature 1
Macromolecules, vol. 17, P. 2288 (1984)
Non Patent Literature 2
Polymer, vol. 24, P. 1299 (1983)
Non Patent Literature 3
Eur.Polym.J., vol. 16, P. 303 (1980)
Non Patent Literature 4
Mol.Cryst.Liq.Cryst., vol. 88, P. 295 (1982)

SUMMARY OF INVENTION

Technical Problem

An object of the present invention is to provide such a thermoplastic resin that (i) the thermoplastic resin itself is excellent in thermal conductivity and (ii) in a case where a thermally conductive filler is added to the thermoplastic resin, a resultant resin composition becomes remarkably high in thermal conductivity.

Solution to Problem

The inventors of the present invention have been diligently examined that a thermal resistance of a contact interface between resin and a thermally conductive filler could be reduced by providing, in ends of molecular chains of the resin, carboxyl groups which combines or has affinity with a thermally conductive filler. As a result, the inventors found that a thermoplastic resin which has a specific molecular structure and in which not less than 60 mol % of ends of molecular chains are carboxyl groups could achieve the object, and the inventors achieved the present invention. the present invention. Specifically, the present invention is as follows (1) to 14)).

1) A thermoplastic resin wherein:
a main chain which mainly has a repeating unit represented by a general formula (1);
60 mol % or more ends of molecular chains are carboxyl groups; and
thermal conductivity of the thermoplastic resin itself is not less than 0.45 W/(m·K), the general formula (1) being as follows:

$$-A^1\text{-}x\text{-}A^2\text{-}y\text{-}R\text{-}z\text{-} \quad (1)$$

where: each of $A^1$ and $A^2$ independently represents a substituent group selected from the group consisting of an aromatic group, a fused aromatic group, an alicyclic group, and an alicyclic heterocyclic group; each of x, y, and z independently represents a direct bond or a bivalent substituent group selected from the group consisting of —$CH_2$—, —$C(CH_3)_2$—, —O—, —S—, —$CH_2$—$CH_2$, —CH=CH—, —C≡C—, —CO—, —CO—O—, —CO—NH—, —CH=N—, —CH=N—N=CH—, —N=N—, and —N(O)=N—; and R represents a bivalent substituent group which has a main chain length of 2 to 20 atoms and may be branched.

2) The thermoplastic resin according to 1), wherein the thermoplastic resin has a number average molecular mass of 3000 to 40000.

3) The thermoplastic resin according to 1) or 2), wherein a part corresponding to -$A^1$-x-$A^2$- of the thermoplastic resin is a mesogenic group expressed by the following general formula (2).

[Chem. 1]

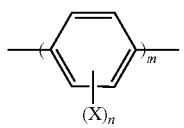
(2)

where: X represents independently aliphatic hydrocarbon group, F, Cl, Br, I, CN, or $NO_2$; n is an integer from 0 to 4; and m is an integer from 2 to 4.

4) The thermoplastic resin according to 1) to 3), wherein R of the thermoplastic resin is a linear aliphatic hydrocarbon chain.

5) The thermoplastic resin according to 1) to 4), wherein R of the thermoplastic resin has even-numbered atoms.

6) The thermoplastic resin according to 1) to 3), wherein R of the thermoplastic resin is at least one selected from the group consisting of —$(CH_2)_8$—, —$(CH_2)_{10}$—, and —$(CH_2)_{12}$—.

7) The thermoplastic resin as set forth according to 1) to 6), wherein -y-R-z- of the thermoplastic resin is —O—CO—R—CO—O—.

8) A thermoplastic resin composition, contains: a thermoplastic resin according to 1) to 7); and a thermally conductive filler.

9) The thermoplastic resin composition according to 8), wherein the thermally conductive filler is at least one highly thermally conductive inorganic compound selected from the group consisting of graphite, conductive metal powder, soft magnetic ferrite, carbon fiber, conductive metal fiber, zinc oxide, and carbon nanotube.

10) The thermoplastic resin composition according to 8), wherein the thermally conductive filler is an electrically insulative and highly thermally conductive inorganic compound itself having thermal conductivity of not less than 2.0 W/m·K.

11) The thermoplastic resin composition according to 8), wherein the thermally conductive filler is at least one highly thermally conductive inorganic compound selected from the group consisting of boron nitride, aluminum nitride, silicon nitride, aluminum oxide, magnesium oxide, magnesium carbonate, aluminum hydroxide, magnesium hydroxide, beryllium oxide, and diamond.

12) The thermoplastic resin composition according to 8), wherein: the thermally conductive filler is an inorganic nitride; and thermal conductivity of the thermoplastic resin composition is not less than 2.0 W/m·K but not more than 50 W/m·K.

13) The thermoplastic resin composition according to 9), wherein: the thermally conductive filler is conductive carbon material; and thermal conductivity of the thermoplastic resin composition is not less than 5.0 W/m·K but not more than 120 W/m·K.

14) A thermoplastic resin of the present invention is resin wherein: a main chain which mainly has a repeating unit represented by a general formula (3); and 60 mol % or more ends of molecular chains are carboxyl groups; and thermal conductivity of the thermoplastic resin itself is not less than 0.45 W/(m·K), the general formula (3) being as follows:

$$-M\text{-}Sp\text{-} \quad (3)$$

where: M represents a mesogenic group; and Sp represents a spacer.

Advantageous Effects of Invention

A thermoplastic resin of the present invention (i) is excellent in thermal conductivity, and, (ii) in a case where a thermally conductive filler is added to the thermoplastic resin, a resultant resin composition becomes remarkably high in thermal conductivity.

DESCRIPTION OF EMBODIMENTS

A thermoplastic resin of the present invention is resin wherein: a main chain which mainly has a repeating unit represented by a general formula (1) or a general formula (3);

60 mol % or more ends of molecular chains are carboxyl groups; and thermal conductivity is not less than 0.45 W/(m—K), the general formula (1) being as follows:

$$-A^1\text{-}x\text{-}A^2\text{-}y\text{-}R\text{-}z\text{-} \quad (1)$$

where: each of $A^1$ and $A^2$ independently represents a substituent group selected from the group consisting of an aromatic group, a fused aromatic group, an alicyclic group, and an alicyclic heterocyclic group; each of x, y, and z independently represents a direct bond or a bivalent substituent group selected from the group consisting of —$CH_2$—, —$C(CH_3)_2$—, —O—, —S—, $CH_2$—$CH_2$, —CH=CH—, —C≡C—, —CO—, —CO—O—, —CO—NH—, —CH=N—, —CH=N—N=CH—, —N=N—, and —N(O)=N—; and R represents a bivalent substituent group which has a main chain length of 2 to 20 atoms and may be branched, the general formula (3) being as follows:

$$-M\text{-}Sp\text{-} \quad (3)$$

where: M represents a mesogenic group; and Sp represents a spacer.

The term "mainly" in the present invention means, as for an amount of the substances expressed by the general formula (1) or the general formula (3) contained in the main chain of a molecular chain, that the amount is not less than 50 mol %, preferably not less than 70 mol %, more preferably not less than 90 mol %, and most preferably substantially not less than 100 mol %, with respect to total structural units. In a case where the amount is less than 50 mol %, the resin may be less crystalline and thus less thermally conductive.

In order to further improve thermal conductivity of a resin composition when a thermally conductive filler is added, a ratio of carboxyl groups with respect to all ends of molecular chains is not less than 60 mol %, preferably not less than 70 mol %, and more preferably not less than 80 mol %, and most preferably not less than 90 mol %. If the ratio of carboxyl groups is less than 60 mol %, the thermal conductivity of the resin composition becomes lower than that of a resin having the ratio of carboxyl groups of not less than 60 mol % when the thermally conductive filler is added.

In terms of accuracy and easiness, it is preferable to calculate the ratio of carboxyl group of the ends by use of an integrated value of a characteristic signal corresponding to each end group by use of 1H-NMR. For example, in a case where (A) resin is sealed with an acetyl group, (B) the acetyl group and a carboxyl group could be ends, and (C) a characteristic signal for distinguishing a carboxyl group is α-position methylene proton of the carboxyl group, the sealing rate can be calculated by use of a formula (4).

[Integrated value of α-position proton/2]/[(Integrated value of α-position proton/2)+(Integrated value of acetyl group/3)]×100=[Ratio of carboxyl groups of ends (%)]  (4)

It is preferable that characteristic signals of ends is calculated from an integrated value of the characteristic signals corresponding to respective end groups by use of FT-IR if the characteristic signals cannot be identified by use of 1H-NMR. For example, in a case where a carboxyl group and an acetoxy group exist in an end, it is possible to measure a peak derived from an —OH group of an end carboxyl group having 3300 $cm^{-1}$ to 2500 $cm^{-1}$ and a peak derived from a —$CH_3$ group of an end acetoxy group having 1360 $cm^{-1}$. A ratio of carboxyl groups can be calculated on the basis of an integrated value of characteristic signals of a resin which is synthesized so as to have 50 mol % of carboxyl groups.

It is preferable that thermoplastic resin of the present invention has mainly a chain structure.

A thermophysical property of the thermoplastic resin of the present invention generally indicates, in a temperature increasing process, (A) a transition point Tm from a solid phase to a liquid crystal phase and (B) a transition point Ti from a liquid crystal phase to an isotropic phase. Such phase transition points can be found out as peaks of heat absorption in a temperature increasing process of the DSC.

The term "thermal conductivity" of the present invention represents thermal conductivity of a molded product in which a thermoplastic resin or a thermoplastic resin composition has been molded to a form suitable for measuring the thermal conductivity. A molded product used to evaluate thermal conductivity of resin itself or a resin composition is preferably molded at a temperature within the range from Tm or more and Ti or less. The molded product cannot be molded at a temperature of not more than Tm and the thermal conductivity of the resin itself or the resin composition sometimes decreases at a temperature of Ti or more. A method for molding resin is not particularly limited, however, the resin is preferably injection-molded in terms of easiness.

Thermal conductivity of the thermoplastic resin according to the present invention is not less than 0.45 W/m·K, preferably not less than 0.6 W/m·K, more preferably not less than 0.8 W/m·K, and most preferably not less than 1.0 W/m·K. An upper limit of the thermal conductivity of the thermoplastic resin is not particularly limited. It is preferable that the thermoplastic resin have thermal conductivity as high as possible. The thermoplastic resin generally has thermal conductivity of not more than 30 W/m·K, and further, not more than 10 W/m·K provided that the thermoplastic resin (A) has a fusing point at which the thermoplastic resin is injection-molded and (B) is not subjected to physical treatments, such as magnetic field application, voltage application, rubbing, and extension, when the thermoplastic resin is formed.

The term "number average molecular mass" of the thermoplastic resin of the present invention refers to a value obtained as follows: assuming that polystyrene is a reference material, the thermoplastic resin of the present invention is measured by GPC at 80° C. by use of a 0.25 wt % solution of the thermoplastic resin in a solvent of p-chlorophenol and o-dichlorobenzene mixed in a ratio of 1:2 (volume ratio). The thermoplastic resin of the present invention has a number average molecular mass preferably of 3000 to 40000. In view of an upper limit of the number average molecular mass, the thermoplastic resin has a number average molecular mass more preferably of 3000 to 30000, and particularly preferably of 3000 to 20000. In view of a lower limit of the number average molecular mass, the thermoplastic resin has a number average molecular mass preferably of 3000 to 40000, more preferably of 5000 to 40000, and particularly preferably of 7000 to 40000. In view of the upper and lower limits of the number average molecular mass, the thermoplastic resin has a number average molecular mass more preferably of 5000 to 30000, and most preferably of 7000 to 20000. The thermoplastic resin which has a number average molecular mass of less than 3000 or more than 40000 may have thermal conductivity of not more than 0.45 W/(m·K) even if the tehrmoplastic resin has an identical primary structure.

It is preferable that the thermoplastic resin of the present invention contains lamellar crystals. In the thermoplastic resin according to the present invention, an amount of lamellar crystals can be used as an indication of crystallinity. The greater the amount of lamellar crystals is, the higher the crystallinity is.

The term "lamellar crystal" referred to in the present invention includes a plate crystal in which long chain molecules are folded so as to be juxtaposed to each other. It is easily determined, by means of transmission electron microscopic (TEM) observation or X-ray diffraction, whether or not such a crystal is contained in resin.

A ratio of lamellar crystals having such a continuous layer structure to resin can be found by directly observing, by a transmission electron microscope (TEM), a sample dyed with $RuO_4$. Specifically, the ratio of lamellar crystals can be found by using, as a sample for TEM observation, an ultrathin slice which has a thickness of 0.1 μm and has been prepared, by a microtome, after cutting out a part of a molded sample (6 mm in thickness×20 mm in diameter) and dying the part with $RuO_4$. The ultrathin slice thus prepared is observed by TEM at an acceleration voltage of 100 kV, so as to obtain a photograph with a 40000×scale (20 cm×25 cm). The photograph allows determination of a lamellar crystal region. A boundary of the lamellar crystal region can be determined assuming that the lamellar crystal region is a region in which a periodic change occurs. Because lamellar crystals are distributed also in a thickness direction, the ratio of lamellar crystals is found as a ratio of the lamellar crystal region to a total area of the photograph. In order to cause resin itself to be highly thermally conductive, the ratio of lamellar crystals is preferably not less than 10 vol %. The ratio of lamellar crystals is more preferably not less than 20 vol %, more preferably not less than 30 vol %, and particularly preferably not less than 40 vol %.

The thermoplastic resin of the present invention preferably contains crystals. In the present invention, crystallinity can be calculated from the ratio of the lamellar crystals to the thermoplastic resin by use of following calculation formula:

Crystallinity (%)=the ratio of the lamellar crystals (Vol %)×0.7

In order to cause the resin itself to be highly thermally conductive, the crystallinity of the thermoplastic resin is preferably not less than 7%. The crystallinity of the thermoplastic resin is more preferably not less than 14%, still more preferably not less than 21%, and particularly preferably not less than 28%.

In order to cause the thermoplastic resin of the present invention to exhibit high thermal conductivity, the resin itself has density preferably of not less than 1.1 g/cm$^3$, more preferably of not less than 1.13 g/cm$^3$, and particularly preferably of not less than 1.16 g/cm$^3$. The resin having a high density means resin which contains a large amount of lamellar crystals, i.e., has a high crystallinity.

The thermoplastic resin used in the present invention is preferably isotropically highly thermally conductive. A method for determining whether or not the thermoplastic resin is isotropically thermally conductive is exemplified by a method in which thermal conductivity in respective thickness and plane directions of a disk-shaped sample (1 mm in thickness×25.4 mm in diameter) into which the thermoplastic resin is molded are separately measured by a Xe flash method. The thermoplastic resin according to the present invention is isotropically highly thermally conductive, and the thermal conductivity measured by the Xe flash method in the respective thickness and plane directions are generally 0.3 W/(m·K) or more.

The mesogenic group M contained in the thermoplastic resin of the present invention means a substituent group which is rigid and highly-oriented. The mesogenic group M corresponds to a general formula (5) of the following general formula (1).

   (1)

   (5)

(where each of A$^1$ and A$^2$ independently represents a substituent group selected from the group consisting of an aromatic group, a fused aromatic group, an alicyclic group, and an alicyclic heterocyclic group; each of x, y, and z independently represents a direct bond or a bivalent substituent group selected from the group consisting of —CH$_2$—, —C(CH$_3$)$_2$—, —O—, —S—, —CH$_2$—CH$_2$—, —CH═CH—, —C≡C—, —CO—, —CO—O—, —CO—NH—, —CH═N—, —CH═N—N═CH—, —N═N—, and —N(O)═N—.)

It is preferable that A$^1$ and A$^2$ are each independently selected from a hydrocarbon group having a C6 to C12 benzene ring, a hydrocarbon group having a C10 to C20 naphthalene ring, a hydrocarbon group a C12 to C24 biphenyl structure, a hydrocarbon group having three or more C12 to C36 benzene rings, a hydrocarbon group having a C12 to C36 fused aromatic group, and a C4 to C36 alicyclic heterocyclic group.

Specific Examples of A$^1$ and A$^2$ include: phenylene, biphenylene, naphthylene, anthracenylene, cyclohexyl, pyridyl, pyrimidyl, and thiophenylene. A$^1$ and A$^2$ can be non-substituent or a derivative which contains a substituent group such as an aliphatic hydrocarbon group, a halogen group, a cyano group, or a nitro group. x is a connector and represents a direct bond or a bivalent substituent group selected from the group consisting of —CH$_2$—, —C(CH$_3$)$_2$—, —O—, —S—, —CH$_2$—CH$_2$—, —CH═CH—, —C≡C—, —CO—, —CO—O—, —CO—NH—, —CH═N—N═CH—, —N═N—, and —N(O)═N—. Of those bivalent substituent groups, a bivalent substituent group whose x, corresponding to the connector has a main chain length of even-numbered atoms is preferable. That is, a direct bond or a bivalent substituent group which is selected from the group consisting of —CH$_2$—CH$_2$—, —CH═CH—, —C≡C—, —CO—O—, —CO—NH—, —CH═N—, —CH═N—N═CH—, —N═N—, and —N(O)═N— is preferable. In a case where x has a main chain length of odd-numbered atoms, the thermoplastic resin is more flexible due to an increase in molecular width of the mesogenic group and an increase in degree of freedom of bond rotation. This urges a decrease in crystallinity and would cause a decrease in thermal conductivity of resin itself.

Specific examples of such a preferable mesogenic group encompass: biphenyl, terphenyl, quarterphenyl, stilbene, diphenyl ether, 1,2-diphenylethylene, diphenylacetylene, benzophenone, phenylbenzoate, phenylbenzamide, azobenzene, azoxybenzene, 2-naphtoate, phenyl-2-naphtoate, and bivalent groups which have a structure in which two hydrogens are removed from a derivative or the like of such a mesogenic group as mentioned above. However, a preferable mesogenic group is not limited to those.

A more preferable mesogenic group is a mesogenic group represented by the general formula (2). This mesogenic group is rigid and highly-oriented due to its structure, and can also be easily available or synthesized.

[Chem. 2]

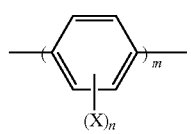   (2)

(where: X independently represents an aliphatic hydrocarbon group, F, Cl, Br, I, CN, or NO$_2$; n represents an integer from 0 to 4; and m represents an integer from 2 to 4.)

In order to obtain a thermoplastic resin composition which has an excellent moldability, it is preferable that a mesogenic group contained in a thermoplastic resin does not contain cross-linking substituent group.

A spacer Sp contained in the thermoplastic resin means a flexible molecular chain, and contains a connector with the mesogenic group. The main chain length of the spacer of the thermoplastic resin is preferably from 4 to 28, more preferably 6 to 24, and still more preferably 8 to 20. If the main chain length of the spacer is less than 4, the thermoplastic resin may not have a satisfactorily flexible molecular structure. This sometimes reduces crystallinity and thermal conductivity. Meanwhile, if the main chain length is not less than 29, the crystallinity may decrease. This reduces the thermal conductivity. Kinds of atoms constituting the main chain of the spacer are not particularly limited, so that any atom can be used. However, the atom is preferably at least one kind of atoms selected from the group of C, H, O, S, and N.

The spacer Sp corresponds to general formula (6) of the following general formula (1).

   (1)

   (6)

(where y and z each independently represent a direct bond or a bivalent substituent group selected from the group consisting of —$CH_2$—, —$C(CH_3)_2$, —O—, S, $CH_2$—$CH_2$—, —CH=CH—, —C≡C—, —CO—, —CO—O—, —CO—NH—, —CH=N—, —CH=N—N=CH—, —N=N—, and —N(O)=N—; and R represents a bivalent substituent group whose main chain length is C2 to 20 atoms and which may be branched.)

R is preferably selected from a C2 to C20 chain saturated hydrocarbon group, a C2 to C20 saturated hydrocarbon group containing 1 to 3 ring structure(s), a C2 to C20 hydrocarbon group containing 1 to 5 unsaturated group(s), a C2 to C20 hydrocarbon group containing 1 to 3 aromatic ring(s), and a C2 to C20 polyether group containing to 5 oxygen atom(s). R is preferably a linear aliphatic hydrocarbon chain which is not branched. R which is branched may urge the thermoplastic resin to be less crystalline and cause a decrease in thermal conductivity of resin itself. R may be saturated or unsaturated, but is preferably a saturated aliphatic hydrocarbon chain. R which contains an unsaturated bond may be insufficiently flexible and cause the thermoplastic resin to be less thermally conductive. R is preferably a linear saturated aliphatic hydrocarbon chain which has C2 to C20, more preferably a linear saturated aliphatic hydrocarbon chain which has C4 to C18, still more preferably a linear saturated aliphatic hydrocarbon chain which has C6 to C16, and particular preferably a linear saturated aliphatic hydrocarbon chain which has C8 to C14. Further, R preferably has a main chain length of even-numbered carbon atoms. R which has a main chain length of odd-numbered carbon atoms causes the mesogenic group to be tilted. This would cause the thermoplastic resin to be less crystalline and less thermally conductive. In particular, for the sake of obtaining resin with excellent thermal conductivity, R is preferably at least one kind selected from —$(CH_2)_8$—, —$(CH_2)_{10}$—, and —$(CH_2)_{12}$—. y and z are groups for bonding a substituent group R with the mesogenic group. Of spacers containing such groups, —O—CO—O—R—O—CO— and —O—CO—R—CO—O— are preferable, and —O—CO—R—CO—O— is particularly preferable for the sake of obtaining resin with an excellent thermal conductivity.

The thermoplastic resin according to the present invention can be produced by any publicly-known method. For simple and easy structural control, the thermoplastic resin is preferably produced by reacting (i) a compound in which the mesogenic group has reactive functional groups at its both ends and (ii) a compound in which the substituent group R has reactive functional groups at its both ends. Examples of such a reactive functional group include publicly-known groups such as a hydroxyl group, a carboxyl group, an alkoxy group, an amino group, a vinyl group, an epoxy group, and a cyano group. A requirement under which such groups react with each other is not particularly limited. For simple and easy synthesis of a thermoplastic resin in which not less than 60 mol % of ends are carboxyl groups, the thermoplastic resin is preferably produced by reacting (i) a compound in which the mesogenic group has hydroxyl groups at its both ends with (ii) a compound in which the substituent group R has carboxyl groups at its both ends. Alternatively, the thermoplastic resin is preferably produced by reacting (i) a compound in which the mesogenic group has carboxyl groups at its both ends with (ii) a compound in which the substituent group R has hydroxyl groups at its both ends, and is particularly preferably produced by excessively using a compound in which the substituent group R has carboxyl groups at its both ends.

The following explains one example of a production method of the thermoplastic resin which contains (i) the compound in which the mesogenic group has hydroxyl groups at its both ends and (ii) the compound in which the substituent group R has carboxyl groups at its both ends. The mesogenic group which has hydroxyl groups at its both ends is reacted with a lower fatty acid such as acetic anhydride, so that the hydroxyl groups are converted to acetic ester individually or at one time. Thereafter, the resultant is subjected to a polycondensation reaction, in one reaction vessel or in different reaction vessels, for acetic acid elimination with the compound in which the substituent group R has carboxyl groups at its both ends. The polycondensation reaction is carried out, generally at a temperature in the range of 250° C. to 350° C., and preferably at a temperature in the range of 270° C. to 330° C., in the presence of substantially no solvent and in the presence of an inert gas such as nitrogen, under an ordinary pressure or under a reduced pressure, for 0.5 hour to 5 hours. The polycondensation reaction progresses slowly at a reaction temperature lower than 230° C., whereas a side reaction such as degradation is likely to occur at a reaction temperature higher than 350° C. In a case where the polycondensation reaction is carried out under a reduced pressure, it is preferable to gradually increase a decompression degree. If the decompression degree is rapidly decreased to high degree of vacuum, excessively added dicarboxylic acid monomers are volatilized, and the ratio of carboxyl groups at the ends of the molecular chains may become less than 60 mol %. Ultimate vacuum is preferably not more than 50 torr, more preferably not more than 30 torr, and particularly preferably not more than 10 torr. If the ultimate vacuum is more than 50 torr, it takes a long time to carry out the polycondensation reaction. Many phases of reaction temperature can be employed. Alternatively, a reaction product may be immediately taken out and collected in its molten state while the reaction temperature is increasing or when the reaction temperature reaches its maximum. The thermoplastic resin thus obtained may be used as it is. Alternatively, the thermoplastic resin thus obtained may be used after an unreacted material is removed from the thermoplastic resin or the thermoplastic resin is subjected to solid phase polymerization so that the thermoplastic resin has a better physical property. The solid phase polymerization may be carried out as follows: The thermoplastic resin thus obtained is mechanically crushed into particles whose size is not more than 3 mm, and preferably not more than 1 mm. Then, the particles are preferably treated in a solid-phase state at a temperature in the range of 100° C. to 350° C. in an atmosphere of an inert gas such as nitrogen or under a reduced pressure for 1 hour to 20 hours. Polymer particles whose size is not less than 3 mm, which are insufficiently treated and cause a problem in terms of physical property, are not preferable. It is preferable to select a treatment temperature and a rate of temperature increase in the solid phase polymerization so as to prevent a fusion of thermoplastic resin particles.

Examples of an acid anhydride of a lower fatty acid, which acid anhydride is used to produce the thermoplastic resin of the present invention, encompass: acid anhydrides of lower fatty acids having a chain length of C2 to C5 such as acetic anhydride, propionic acid anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic acid anhydride, butyric anhydride, isobutyric acid anhydride, valeric acid anhydride, and pivalic acid anhydride. In particular, acetic anhydride, propionic acid anhydride, and trichloroacetic acid anhydride are suitably used in particular. An acid anhydride of a lower fatty acid is used in an equivalent weight of 1.01 time to 1.50 time, and preferably of 1.02 time to 1.20 time with respect to a total amount of hydroxyl groups contained in the mesogenic group to be used.

A method for producing a thermoplastic resin containing a compound having a carboxyl group at its both ends and a compound having a hydroxyl group at its both ends can be exemplified by a method for producing a thermoplastic resin, in which method transesterification is carried out by mixing a melted thermoplastic resin material in the presence of an appropriate catalyst.

Examples of the catalyst encompass: germanium compounds such as germanium oxide; tin compounds such as stannous oxalate, stannous acetate, alkyl tin oxide, and diaryl tin oxide; titanium compounds such as titanium dioxide, titanalkoxides, and alkoxy titanium silicate; metallic salts of organic acid, such as sodium acetate, potassium acetate, calcium acetate, zinc acetate, and ferrous acetate; Lewis acids such as BF3 and AlCl3; inorganic acids such as amines, amides, hydrochloric acid, and sulfuric acid.

The thermoplastic resin of the present invention may be copolymerized with another monomer, provided that the thermoplastic resin still can yield its effect. Examples of the another monomer encompass: aromatic hydroxycarboxylic acid, aromatic dicarboxylic acid, aromatic diol, aromatic hydroxylamine, aromatic diamine, aromatic aminocarboxylic acid, caprolactams, caprolactones, aliphatic dicarboxylic acid, aliphatic diol, aliphatic diamine, alicyclic dicarboxylic acid, alicyclic diol, aromatic mercaptocarboxylic acid, aromatic dithiol, and aromatic mercaptophenol.

Specific examples of the aromatic hydroxycarboxylic acid encompass: 4-hydroxybenzoic acid, 3-hydroxybenzoic acid, 2-hydroxybenzoic acid, 2-hydroxy-6-naphthoic acid, 2-hydroxy-5-naphthoic acid, 2-hydroxy-7-naphthoic acid, 2-hydroxy-3-naphthoic acid, 4'-hydroxyphenyl-4-benzoic acid, 3'-hydroxyphenyl-4-benzoic acid, and 4'-hydroxyphenyl-3-benzoic acid, each of which may or may not be substituted with an alkyl, alkoxy, or halogen.

Specific examples of the aromatic dicarboxylic acid encompass: terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, 3,4'-dicarboxybiphenyl, 4,4''-dicarboxyterphenyl, bis(4-carboxyphenyl)ether, bis(4-carboxyphenoxy)butane, bis(4-carboxyphenyl)ethane, bis(3-carboxyphenyl)ether, bis(3-carboxyphenyl)ethane, and the like, each of which may or may not be substituted with an alkyl, alkoxy, or halogen.

Specific examples of the aromatic diol encompass: hydroquinone, resorcin, 2,6-dihydroxynaphthalene, 2,7-dihydroxynaphthalene, 1,6-dihydroxynaphthalene, 3,3'-dihydroxybiphenyl, 3,4'-dihydroxybiphenyl, 4,4'-dihydroxybiphenyl, 4,4'-dihydroxybiphenol ester, bis(4-hydroxyphenyl)ethane, 2,2'-dihydroxybinaphthyl, and the like, each of which may or may not be substituted with an alkyl, alkoxy, or halogen.

Specific examples of the aromatic hydroxylamine encompass: 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, 4-amino-4'-hydroxybiphenyl sulfide, and 2,2'-diaminobinaphthyl, each of which may or may not be substituted with an alkyl, alkoxy, or halogen.

Specific examples of the aromatic diamine and the aromatic aminocarboxylic acid encompass: 1,4-phenylenediamine, 1,3-phenylenediamine, N-methyl-1,4-phenylenediamine, N,N'-dimethyl-1,4-phenylenediamine, 4,4'-diaminophenyl sulfide (thiodianiline), 4,4'-diaminobiphenyl sulfone, 2,5-diaminotoluene, 4,4'-ethylenedianiline, 4,4'-diaminobiphenoxyethane, 4,4'-diaminobiphenyl methane (methylenedianiline), 4,4'-diaminobiphenyl ether (oxydianiline), 4-aminobenzoic acid, 3-aminobenzoic acid, 6-amino-2-naphthoic acid, and 7-amino-2-naphthoic acid, each of which may or may not be substituted with an alkyl, alkoxy, or halogen.

Specific examples of the aliphatic dicarboxylic acid encompass: oxalic acid, malonic acid, succinic acid, glutaric acid, adipic acid, pimelic acid, suberic acid, azelaic acid, sebacic acid, dodecanedioic acid, tetradecanedioic acid, fumaric acid, and maleic acid.

Specific examples of the aliphatic diamine encompass: 1,2-ethylenediamine, 1,3-trimethylenediamine, 1,4-tetramethylenediamine, 1,6-hexamethylenediamine, 1,8-octanediamine, 1,9-nonanediamine, 1,10-decanediamine, and 1,12-dodecanediamine.

Specific examples of the alicyclic dicarboxylic acid, the aliphatic diol, and the alicyclic diol encompass: linear or branched aliphatic diols such as hexahydroterephthalic acid, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, ethylene glycol, propylene glycol, butylene glycol, 1,3-propanediol, 1,2-propanediol, 1,4-butanediol, 1,6-hexanediol, 1,8-octanediol, 1,10-decanediol, 1,12-dodecanediol, neopentyl glycol, and the like, and reactive derivatives thereof.

Specific examples of the aromatic mercaptocarboxylic acid, the aromatic dithiol, and the aromatic mercaptophenol encompass: 4-mercaptobenzoic acid, 2-mercapto-6-naphthoic acid, 2-mercapto-7-naphthoic acid, benzene-1,4-dithiol, benzene-1,3-dithiol, 2,6-naphthalene-dithiol, 2,7-naphthalene-dithiol, 4-mercaptophenol, 3-mercaptophenol, 6-mercapto-2-hydroxynaphthalene, 7-mercapto-2-hydroxynaphthalene, and the like, and reactive derivatives thereof.

A resin composition is prepared by adding a thermally conductive filler into the thermoplastic resin of the present invention. This can further improve thermal conductivity of the resin composition. The thermal conductivity of the resin composition is preferably not less than 0.4 W/(m·K), more preferably not less than 1.0 W/(m·K), and still more preferably not less than 5.0 W/(m·K), and particularly preferably not less than 10 W/(m·K). If the thermal conductivity is less than 0.4 W/(m·K), it is difficult to effectively conduct, to the outside, heat generated from an electric component. An upper limit of the thermal conductivity of the thermoplastic resin is not particularly limited. It is preferable that the thermoplastic resin has thermal conductivity as high as possible, however, a thermoplastic resin whose thermal conductivity is not more than 100 W/(m·K), and further, not more than 80 W/(m·K) is generally used. Since the thermoplastic resin of the present invention has excellent thermal conductivity, it is easily possible to obtain a highly thermally conductive thermoplastic resin composition having thermal conductivity which falls within the above range.

The usage amount of the thermally conductive filler contained in the thermoplastic resin of the present invention is preferably 90:10 to 30:70, more preferably 80:20 to 40:60, and particularly preferably 70:30 to 50:50 at a volume ratio of the thermoplastic resin to the thermally conductive filler. If the volume ratio of the thermoplastic resin to the thermally conductive filler is 100:0 to 90:10, satisfactory thermal conductivity cannot be obtained in some cases. If the volume ratio of the thermoplastic resin to the thermally conductive filler is 30:70 to 0:100, a mechanical property may decreases. Since the thermoplastic resin of the present invention has excellent thermal conductivity, the usage amount of the thermally conductive filler is low (90:10 to 70:30) at the volume ratio of the thermoplastic resin to the thermally conductive filler, the resin composition exhibits excellent thermal conductivity, and in addition, can be less dence because the usage amount of thermally conductive filler is small. The resin composition, which has excellent thermal conductivity and is less dense, is advantageous for use as a heat radiating or heat transmitting resin material for various fields such as electric, electronic, and automotive industries.

A publicly-known filler can be extensively used as the thermally conductive filler. Thermal conductivity of the thermally conductive filler itself is preferably not less than 10 W/(m·K), more preferably not less than 15 W/(m·K), most preferably not less than 20 W/(m·K), and particularly preferably not less than 30 W/(m·K) is used. An upper limit of the thermal conductivity of the thermally conductive filler itself is not particularly limited. It is preferable that the highly thermally conductive compound has thermal conductivity as high as possible. The thermally conductive compound whose thermal conductivity is preferably not more than 3000 W/(m·K), and more preferably not more than 2500 W/(m—K) is generally used.

In a case where the thermally conductive filler is used for an application in which an electric insulation property is not particularly required as a composition, a metal compound, a conductive carbon compound, or the like is preferably used. Of these compounds, thermally conductive fillers such as: conductive carbon materials such as graphite and carbon fiber; conductive metal powder obtained by microparticulating various metals; conductive metal fiber obtained by fibrously processing various metals; and metal oxides such as ferrites including a soft magnetic ferrite and zinc oxide are preferably usable, in terms of excellent thermal conductivity.

In a case where the thermally conductive filler is used for an application in which an electric insulation property is required as a composition, a compound which has an electric insulation property is preferably used. Note that having an electric insulation property specifically means having an electric resistance of not less than 1 Ω·cm. It is advantageous to use a compound which has an electric resistance preferably of not less than 10 Ω·cm, more preferably of not less than $10^5$ Ω·cm, still more preferably of not less than $10^{10}$ Ω·cm, and most preferably of not less than $10^{13}$ Ω·cm. An upper limit of the electric resistance is not particularly limited. A compound which has an electric resistance of not more than $10^{18}$ Ω·cm is generally used. It is preferable that a molded product obtained from the highly thermally conductive thermoplastic resin composition of the present invention also has an electric insulation property falling within the above range.

Specific examples of the thermally conductive filler having electric insulation property encompass: metal oxides such as aluminum oxide, magnesium oxide, silicon oxide, beryllium oxide, copper oxide, and cuprous oxide; metal nitrides such as boron nitride, aluminum nitride, and silicon nitride; metal carbides such as silicon carbide; metal carbonates such as magnesium carbonate; insulating carbon materials such as diamond; and metal hydroxides such as aluminum hydroxide and magnesium hydrate. These compounds can be used solely or in combination of two or more kinds.

The thermally conductive fillers can have various shapes. Examples of the various shapes encompass: particles, fine particles, nanoparticles, agglomerated particles, a tubular shape, a nanotubular shape, a wire shape, a rod shape, a needle shape, a plate shape, an amorphous shape, a rugby ball shape, a hexahedral shape, composite particles in which large particles and microparticles are mixed with each other, and a liquid. Note that the thermally conductive fillers may be natural products or synthetic products. In the case of natural products, where they are come from is not particularly limited and they can be appropriately selected. The thermally conductive fillers can be used solely or in combination of two or more kinds which are different in shape, average particle size, kind, surface treatment agent, and the like.

The thermally conductive fillers, which increase adhesiveness at an interface between a resin and an inorganic compound and facilitate processability, can be subjected to a surface treatment carried out by use of various surface treatment agents such as a silane treatment agent. A surface treatment agent is not particularly limited, and conventionally publicly known surface treatment agents such as a silane coupling agent and a titanate coupling agent are usable. In particular, a silane coupling agent containing an epoxy group such as epoxy silane, a silane coupling agent containing an amino group such as aminosilane, and a polyoxyethylene silane coupling agent are preferable because they are less likely to cause deterioration in properties of resin. A method for carrying out a surface treatment with respect to an inorganic compound is not particularly limited, and a general surface treatment method can be employed.

Publicly-known fillers other than the above-described thermally conductive fillers are extensively usable together with the thermoplastic resin of the present invention according to need. Even in a case where the publicly-known fillers have relatively low thermal conductivity, i.e., less than 10 W/(m·K), the resin composition is highly thermally conductive because the resin itself is highly thermally conductive. Examples of a filler other than the thermally conductive fillers encompass: diatomite powder; basic magnesium silicate; calcined clay; micronized silica; quartz powder; crystalline silica; kaolin; talc; antimony trioxide; micronized mica; molybdenum disulfide; rock wool; ceramic fiber; inorganic fiber such as asbestos; and glass fillers such as glass fiber, glass powder, glass cloth, and molten silica. Use of such a filler allows an increase in property such as thermal conductivity, mechanical strength, and abrasion resistance which are suitable for practical use of the resin composition. Further, according to need, an organic filler such as: paper, pulp, and wood material; synthetic fibers including polyamide fiber, aramid fiber, and boron fiber; and resin powder including polyolefin powder can be blended in combination.

The thermoplastic resin of the present invention can contain any publicly-known resin such as epoxy resin, polyolefin resin, bismaleimide resin, polyimide resin, polyether resin, phenol resin, silicone resin, polycarbonate resin, polyamide resin, polyester resin, fluororesin, acrylic resin, melamine resin, urea resin, and urethane resin, provided that the thermoplastic resin continues to yield an effect of the present invention. Specific examples of a preferable resin encompass: polycarbonate, polyethylene terephthalate, polybutylene terephthalate, a liquid crystal polymer, nylon 6, and nylon 6,6. Generally, a usage amount of each of the resins is 0 part by weight to 10000 parts by weight with respect to 100 parts by weight of the thermoplastic resin of the present invention contained in a resin composition.

According to need, any other component such as a reinforcer, a thickner, a mold release agent, a coupling agent, a flame retarder, a flame-resistant agent, a pigment, a coloring agent, and other auxiliary agents can be added, as an additive other than the resins and the fillers mentioned above, to the thermoplastic resin of the present invention, provided that the thermoplastic resin continues to yield an effect of the present invention. A usage amount of additive is preferably 0 part by weight to 20 parts by weight in total with respect to 100 parts by weight of the thermoplastic resin.

A method for blending a composition to the thermoplastic resin of the present invention is not particularly limited. For example, the thermoplastic resin composition can be produced as follows: components, an additive, and/or the like mentioned above are dried, so as to be subjected to melt-kneading by use of a melt-kneading machine such as a single screw extruder or a double screw extruder. Note that, in a case where a blended component is a liquid, it is also possible to produce the thermoplastic resin composition by adding, in the middle of the melt-kneading, the liquid into the melt-kneading machine by use of a liquid supply pump or the like.

It is possible to extensively use the thermoplastic resin of the present invention for various applications such as an electronic material, a magnetic material, a catalytic material, a structure material, an optical material, a medical material, an automotive material, and an architectural material. Particularly because the thermoplastic resin has excellent properties of both remarkable molding workability and a high thermal conductivity, the thermoplastic resin is extremely useful as a heat-radiating/heat-conduvtive resin.

The thermoplastic resin of the present invention is suitably used for injection-molded products and extrusion-molded products of electric appliances, OA equipment parts, AV equipment parts, automotive exterior and interior parts, and the like. The thermoplastic resin of the present invention is particularly suitable used as a heat sink, a heat-radiation spacer, and an exterior part in electric appliances and in OA equipment which generates a large amount of heat. Further, in an electronic device in which a heating source is provided but it is difficult to cause a fan or the like to carry out forced cooling, the thermally conductive resin composition of the present invention is preferably usable as an exterior part of such an electronic device so that heat generated inside the electronic device is radiated to outside the electronic device. In particular, the thermoplastic resin of the present invention can be extremely preferably used for: (A) heat sinks, cases, housings, or external materials preferably of a portable computer such as a laptop personal computer and small-sized or portable electronic devices such as a PDA, a mobile phone, a portable game machine, a portable music player, a portable TV/video device, and a portable video camera; (B) a heat sink, a case, a housing, a lens holder, and the like of a projector; (C) cases for batteries and peripheral equipment of an automobile, an electric train, and the like; (D) cases and peripheral equipment for portable batteries of electric appliances; (E) power distribution parts such as various electric breakers, connectors, covers of the connectors; (F) a coil bobbin, a sealing material, a case for a motor, and the like; (G) heat sinks, cases, substrates, interior parts, and peripheral equipment of an LED bulb, an LED straight pipe bulb, organic EL illumination, and the like; (H) module members of a solar cell and the like; (I) a case and a connector of a temperature sensor; (J) sealing material for various devices, such as a power device and the like, which are required to radiate heat; (K) thermally conductive laminated plates on which the various devices are mounted; and (L) head peripheral equipment and cases of various storage devices such as an HDD, a DVD, and a Blu-Ray disc.

The thermoplastic resin of the present invention can be more highly thermally conductive than conventionally-known resins, and has satisfactory molding workability. Therefore, the thermoplastic resin is useful for components or housings of the above-mentioned applications.

EXAMPLE

The following description more specifically discusses the thermoplastic resin of the present invention with reference to Examples and Comparative Examples. The present invention is not limited only to the Examples. Note that reagents produced by Wako Pure Chemical Industries, Ltd. were used as reagents described below if not otherwise specified.

[Evaluation Method]

Molding of test piece: obtained samples were dried and melted at a temperature 10° C. higher than a transition point Tm which is a point from a solid phase to a liquid crystal phase (specifically, by setting a cylinder temperature), and were molded into disc samples (6 mm in thickness×20 mm in diameter) by use of an injection-molding device.

Thermal conductivities: the disc samples (6 mm in thickness×20 mm in diameter) were measured by use of a sensor of 4 in diameter in a hot disk method thermal conductivity measuring device produced by KYOTO ELECTRONICS MANUFACTURING CO., LTD.

Sealing rate of ends: a ratio of the carboxyl group end was measured on the basis of integrated value of characteristic signals of end groups by use of 1H-NMR (under the condition of 400 MHz, and in a deuterated chloroform : deuterated trifluoroacetic acid=2:1 (volume ratio) solvent). Chemical shift values of typical signals for use in the measurement are shown in the following Table 1.

TABLE 1

| Kinds of end groups | Chemical shift values of typical signals |
|---|---|
| 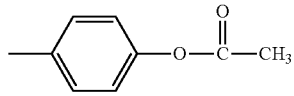 | $\delta$2.45 ppm |
| 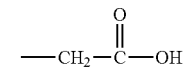 | $\delta$2.49 ppm |
| 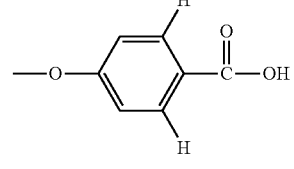 | $\delta$8.09 ppm |
| 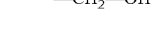 | $\delta$3.82 ppm |
| 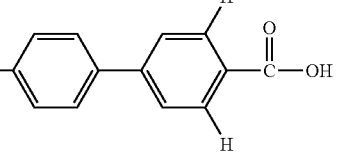 | $\delta$8.12 ppm |

Measurement of number average molecular mass: a sample solution was prepared by dissolving the thermoplastic resin of the present invention in a mixed solvent (1:2 volume ratio) of p-chlorophenol and o-dichlorobenzene so that the sample solution has a concentration of 0.25 wt %. Polystyrene [sold by Chemco Scientific Co., Ltd.; molecular weight (Mw/Mn): 390,000(1.06), 200,000(1.06), 65,000(1.06), 30,000(1.06), 3,350(1.10), 1,241(1.07)] was used as a reference material, so as to prepare a similar sample solution. A number average molecular mass of the thermoplastic resin was measured by high-temperature GPC (150-CV, produced by Waters Corporation) under the conditions of INJECTOR COMP: 80° C., COLUMN COMP: 80° C., PUMP/SOL-

Example 1

A mixture of 4,4'-dihydroxybiphenyl, dodecanedioic acid, and acetic anhydride at a molar ratio of 1.03:1:2.1 in which dodecanedioic acid was excess by 3 mol % was prepared in a reactor vessel. Further, sodium acetate (0.02 mol % with respect to 4,4'-dihydroxybiphenyl) was added as a catalyst. An acetylated reaction was carried out under an ordinary pressure in an atmosphere of nitrogen gas at 150° C. for an hour, and polycondensation was conducted in the reactor vessel heated to 260° C. at a rate of temperature increase of 1° C. /min. When an amount of distillate acetic acid reached 90% of a theoretical yield of acetic acid, approximately 20 minutes were spent to reduce the pressure inside the reactor vessel to 50 torr with the temperature maintained at 260° C., so as to carry out melt polymerization. After half an hour from a start of reducing of the pressure, the pressure inside the reactor vessel was brought back to an ordinary pressure with an inert gas, and then a generated polymer was collected.

A molecular structure is shown in Table 2, and a ratio of carboxyl groups of ends, a number average molecular mass, and thermal conductivity of the resin itself are shown in Table 3.

An obtained thermoplastic resin and boron nitride powders (h-BN) (PT110, produced by Momentive Performance Materials Inc.; thermal conductivity itself: 60 W/(m·K); a volume average particle size: 45 μm; electrically insulative, a volume resistivity: $10^{14}$ {fourth root}·cm) serving as a thermally conductive filler are mixed at a ratio of 50:50 Vol %. AO-60 (produced by ADEKA CORPORATION) which is a phenolic stabilizer was added to the mixture in 0.2 part by weight with respect to 100 parts by weight of thermoplastic resin. Then, the mixtures were melt-mixed by use of Labo-plastomill (30C150, produced by TOYO SEIKI SEISAKU-SHO, LTD) at 210° C. for 7 minutes, so as to obtain resin compositions to be evaluated. The resin compositions were molded into disk-shaped samples (6 mm in thickness×20 mm in diameter) by an injection molding machine, so as to measure thermal conductivity of the respective disk-shaped samples. Table 4 shows a result of the measurement.

Example 2

Polymerization was carried out in the same way as that in Example 1, except that an excessive preparation amount of dodecanedioic acid of Example 1 was changed to 5 mol %, thereby producing a thermoplastic resin. A molecular structure is shown in Table 2, and a ratio of carboxyl groups of ends, a number average molecular mass, thermal conductivity of a resin itself are shown in Table 3. Further, a measurement result of thermal conductivity of a resin composition containing boron nitride powders is shown in Table 4, which is the same as Example 1.

Examples 3 and 4

Polymerization was carried out in the same way as that in Example 2, except that dodecanedioic acid of Example 2 was changed to sebacic acid in Example 3 and was changed to tetradenanedioic acid in Example 4, thereby producing a thermoplastic resin. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Comparative Examples 1 and 2

Polymerization was carried out in the same way as that in Example 1, except that 4,4'-dihydroxybiphenyl and dodecanedioic acid of Example 1 were mixed in a ratio of 1:1 in Comparative Example 1 and in a ratio of 1.03:1 in Comparative Example 2, thereby producing a thermoplastic resin. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Example 5

4,4'-biphenyldicarboxylic acid and 1,10-decanediol were prepared in a molar ratio of 1.05:1 in a reactor vessel, and $5 \times 10^{-4}$ mol of TBT (tetrabutyl titanate) with respect to 1 mol of a constituent unit of polyester was added as a catalyst. Transesterification is carried out with respect to the mixture at a temperature of 280° C., and water was distilled. Then, twenty minuites were spent to reduce the pressure inside the reactor vessel to 50 torr, and the resultant substance was subjected to polycondensation at 280° C. for 1.5 hours. After that the pressure inside the reactor vessel was brought back to an ordinary pressure with an inert gas, and a generated polymer was collected. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Example 6

Polymerization was carried out in the same way as that in Example 5, except that 1,10-decanediol was changed to triethylene glycol. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Example 7

Polymerization was carried out in the same way as that in Example 2, except that 4,4'-dihydroxybiphenyl was changed to 4-acetoxybenzoic acid-4-acetoxyphenyl, thereby producing a thermoplastic resin. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Example 8

Polymerization was carried out in the same way as that in Example 2, except that 4,4'-dihydroxybiphenyl was changed to 4,4'-diacetoxyazoxybenzene, thereby producing a thermoplastic resin. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Comparative Examples 3 and 4

Polymerization was carried out in the same way as that in Example 1, except that a time period for polymerization under a reduced pressure of Example 1 was changed to 0 hour in Comparative Example 3and 6 hours in Comparative Example 4, thereby producing a resin having a different number average molecular mass. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Example 9

Polymerization was carried out in the same way as that in Example 1, except that (A) preparation materials of Example 1 were changed to 4,4'-dihydroxybiphenyl, dodecanedioic acid, 4-hydroxybenzoic acid, and acetic anhydride and (B) a mixture of 4,4'-dihydroxybiphenyl, dodecanedioic acid, 4-hydroxybenzoic acid, and acetic anhydride at a molar ratio of 1:1.05:2:3.1 in which dodecanedioic acid was excess by 5 mol % in a reactor vessel. Thus a thermoplastic resin in which the resin of Example 1 is co-polymerized with 4-hydroxybenzoic acid was produced. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

Examples 10 and 11, and Comparative Examples 5 and 6

A mixture was prepared in which (i) the thermoplastic resin synthesized in Examples 1, 2 and Comparative Examples 1, 2 and (ii) natural plate-like graphite powder (GC) (BF-250A, produced by Chuetsu Graphite Works Co., Ltd.; a thermal conductivity itself: 1200 W/(m—K); a volume average particle size: 250.0 μm; electroconductive;) were mixed in a ratio of 40:60 vol %. AO-60 (produced by ADEKA CORPORATION) which is a phenolic stabilizer was added to the mixture in 0.2 parts by weight with respect to 100 parts by weight of thermoplastic resin. Then, the mixture was melt-mixed by use of Labo-plastomill (30C150, produced by TOYO SEIKI SEISAKU-SHO, LTD) at 210° C. for 7 minutes, so as to obtain a resin composition to be evaluated. The resin composition was molded into a disk-shaped sample (6 mm in thickness×20 mm in diameter) by an injection molding machine, so as to measure a thermal conductivity of the disc sample. Table 5 shows a result of the measurement.

Example 12

A mixture of 4,4'-dihydroxyphenyl, dodecanedioic acid, and acetic anhydride at a molar ratio of 1:1.1:2.1 in which dodecanedioic acid was excess by 10 mol % was prepared in a sealed reactor vessel provided with a reflux condenser, a thermometer, a nitrogen introduction tube, and a stirring rod. Further, sodium acetate (0.02 mol % with respect to 4,4'-dihydroxybiphenyl) was added as a catalyst. The mixture was reacted under an ordinary pressure in an atmosphere of nitrogen gas at 145° C., thereby producing a uniform solvent. After that, a temperature of the uniform solvent was increased to 260° C. at a rate of temperature increase of 2° C./min while acetic acid was distilled, and was agitated for an hour at 260° C. Forty minutes were spent to reduce the pressure inside the sealed reactor vessel to 10 torr with the temperature maintained at 260° C. Then a decompression state was kept. After two hours from a start of reducing of the pressure, the pressure inside the reactor vessel was brought back to an ordinary pressure with nitrogen gas, and then a generated polymer was collected. A molecular structure is shown in Table 2, and a ratio of carboxyl groups of ends, a number average molecular mass, and thermal conductivity of a resin itself are shown in Table 3.

an obtained thermoplastic resin and boron nitride powders (h-BN) (PT110, produced by Momentive Performance Materials Inc.; thermal conductivity itself: 60 W/(m·K); a volume average particle size: 45 μm; electrically insulative, a volume resistivity: $10^{14}$ Ω·cm) serving as a thermally conductive filler are mixed at a ratio of 50:50 Vol %. AO-60 (produced by ADEKA CORPORATION) which is a phenolic stabilizer was added to the mixture in 0.2 parts by weight with respect to 100 parts by weight of thermoplastic resin. Then, the mixture was melt-mixed by use of Labo-plastomill (30C150, produced by TOYO SEIKI SEISAKU-SHO, LTD) at 210 ° C. for 7 minutes, so as to obtain a resin composition to be evaluated. The resin composition was molded into a disk-shaped sample (6 mm in thickness×20 mm in diameter) by an injection molding machine, so as to measure a thermal conductivity of the disc sample. Table 4 shows a result of the measurement.

Examples 13 and 14

Polymerization was carried out in the same way as that in Example 12, except that dodecanedioic acid of Example 12 was changed to sebacic acid in Example 13 and was changed to tetradenanedioic acid in Example 14, thereby producing a thermoplastic resin. A molecular structure is shown in Table 2, and a ratio of carboxyl groups of ends, a number average molecular mass, and thermal conductivity of a resin itself are shown in Table 3. Further, a measurement result of thermal conductivity of a resin composition containing boron nitride powders is shown in Table 4, which is the same as Example 1.

TABLE 2

| | Mesogenic group M | | |
|---|---|---|---|
| | $A^1$ | x | $A^2$ |
| Ex. 1, 2, 12<br>Co. Ex. 1 to 4<br>Ex. 9 | ⌬ | —<br>(Direct bonding) | ⌬ |

TABLE 2-continued

| | Ar1 | Linking group | Ar2 |
|---|---|---|---|
| Ex. 3, 13 | –C6H4– | — (Direct bonding) | –C6H4– |
| Ex. 4, 14 | –C6H4– | — (Direct bonding) | –C6H4– |
| Ex. 5 | –C6H4– | — (Direct bonding) | –C6H4– |
| Ex. 6 | –C6H4– | — (Direct bonding) | –C6H4– |
| Ex. 7 | –C6H4– | —O—C(=O)— | –C6H4– |
| Ex. 8 | –C6H4– | —N(O)=N— | –C6H4– |

| | Spacer Sp | | |
|---|---|---|---|
| | y | R | z |
| Ex. 1, 2, 12<br>Co. Ex. 1 to 4<br>Ex. 9 | —O—C(=O)— | —(CH2)10— | —C(=O)—O— |
| Ex. 3, 13 | —O—C(=O)— | —(CH2)8— | —C(=O)—O— |
| Ex. 4, 14 | —O—C(=O)— | —(CH2)12— | —C(=O)—O— |
| Ex. 5 | —C(=O)—O— | —(CH2)10— | —O—C(=O)— |
| Ex. 6 | —C(=O)—O— | —(C2H5O)2C2H5— | —O—C(=O)— |
| Ex. 7 | —O—C(=O)— | —(CH2)10— | —C(=O)—O— |
| Ex. 8 | —O—C(=O)— | —(CH2)10— | —C(=O)—O— |

| | other than —M—Sp— [%] | |
|---|---|---|
| Ex. 1, 2, 12 | 0 | — |
| Co. Ex. 1 to 4 | 0 | — |
| Ex. 9 | 50 | —O—C6H4—C(=O)—O— |
| Ex. 3, 13 | 0 | — |
| Ex. 4, 14 | 0 | — |
| Ex. 5 | 0 | — |
| Ex. 6 | 0 | — |
| Ex. 7 | 0 | — |
| Ex. 8 | 0 | — |

TABLE 3

|  | Ex. 1 | Ex. 2 | Ex. 3 | Ex. 4 | Ex. 5 | Ex. 6 | Ex. 7 |
|---|---|---|---|---|---|---|---|
| Ratio of carboxyl groups of ends [mol %] | 64 | 82 | 78 | 83 | 65 | 64 | 75 |
| Number average molecular mass | 10800 | 9500 | 10500 | 8500 | 12000 | 9200 | 7960 |
| Thermal conductivity of resin itself [W/mK] | 1.01 | 1.27 | 0.72 | 1.18 | 0.67 | 0.50 | 0.99 |

|  | Ex. 8 | Ex. 9 | Ex. 12 | Ex. 13 | Ex. 14 |
|---|---|---|---|---|---|
| Ratio of carboxyl groups of ends [mol %] | 76 | 80 | 98 | 98 | 98 |
| Number average molecular mass | 13600 | 11400 | 10300 | 9800 | 11300 |
| Thermal conductivity of resin itself [W/mK] | 0.92 | 0.52 | 1.10 | 0.65 | 1.15 |

|  | Co. Ex. 1 | Co. Ex. 2 | Co. Ex. 3 | Co. Ex. 4 |
|---|---|---|---|---|
| Ratio of carboxyl groups of ends [mol %] | 50 | 34 | 49 | 82 |
| Number average molecular mass | 11200 | 9800 | 2800 | 42000 |
| Thermal conductivity of resin itself [W/mK] | 1.02 | 0.99 | 0.43 | 0.42 |

|  | Ex. 1 | Ex. 2 | Ex. 3 | Ex. 4 | Ex. 5 | Ex. 6 | Ex. 7 |
|---|---|---|---|---|---|---|---|
| Thermal conductivity of resin composition [W/mK] | 12 | 15 | 9.5 | 14 | 9.2 | 7.1 | 12 |

|  | Ex. 8 | Ex. 9 | Ex. 12 | Ex. 13 | Ex. 14 |
|---|---|---|---|---|---|
| Thermal conductivity of resin composition [W/mK] | 12 | 7.5 | 15 | 9.5 | 15 |

|  | Co. Ex. 1 | Co. Ex. 2 | Co. Ex. 3 | Co. Ex. 4 |
|---|---|---|---|---|
| Thermal conductivity of resin composition [W/mK] | 10 | 10 | 6.2 | 6.1 |

TABLE 5

| Composition [Vol %] | Ex. 10 | Ex. 11 | Co. Ex. 5 | Co. Ex. 6 |
|---|---|---|---|---|
| Thermal conductivity [W/mK] | 38 | 40 | 30 | 30 |

A thermoplastic resin of the present invention has excellent thermal conductivity, and, in a case where thermally conductive filler was added to the thermoplastic resin, the resultant thermoplastic resin composition becomes remarkably high in thermal conductivity. Further, the thermoplastic resin can be injection-molded even by use of a general injection mold. Such composition is advantageous for use as a heat radiating or heat transmitting resin material in various fields such as electric, electronic, and automotive industries.

The invention claimed is:

1. A thermoplastic resin wherein:
    a main chain which mainly has a repeating unit represented by a general formula (1);
    60 mol % or more ends of molecular chains are carboxyl groups; and
    thermal conductivity of the thermoplastic resin itself is not less than 0.45 W/(m·K), the general formula (1) being as follows:

$$-A^1-x-A^2-y-R-z- \quad (1)$$

where: each of $A^1$ and $A^2$ independently represents a substituent group selected from the group consisting of an aromatic group, a fused aromatic group, an alicyclic group, and an alicyclic heterocyclic group; each of x, y, and z independently represents a direct bond, or a bivalent substituent group selected from the group consisting of —$CH_2$—, —$C(CH_3)_2$—, —O—, —S—, —$CH_2$—$CH_2$—, —CH═CH—, —C≡C—, —CO—O—, —CO—NH—, —CH═N—, —CH═N—N═CH—, —N═N—, and —N(O)═N—; and R represents a bivalent substituent group which has a main chain length of 2 to 20 atoms and may be branched.

2. The thermoplastic resin as set forth in claim 1, wherein the thermoplastic resin has a number average molecular mass of 3000 to 40000.

3. The thermoplastic resin as set forth in claim 1, wherein a mesogenic group M corresponding to -$A^1$-x-$A^2$- of the thermoplastic resin is a mesogenic group expressed by the following general formula (2),

[Chem. 1]

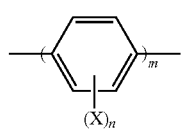

(2)

where: X represents independently aliphatic hydrocarbon group, F, Cl, Br, I, CN, or $NO_2$; n is an integer from 0 to 4; and m is an integer from 2 to 4.

4. The thermoplastic resin as set forth in claim 1, wherein R of the thermoplastic resin is a linear aliphatic hydrocarbon chain.

5. The thermoplastic resin as set forth in claim 1, wherein R of the thermoplastic resin has even-numbered atoms.

6. The thermoplastic resin as set forth in any claim 1, wherein R of the thermoplastic resin is at least one selected from the group consisting of $-(CH_2)_8-$, $-(CH_2)_{10}-$, and $-(CH_2)_{12}-$.

7. The thermoplastic resin as set forth in claim 1, -y-R-z- of the thermoplastic resin is $-O-CO-R-CO-O-$.

8. A thermoplastic resin composition, comprising:
a thermoplastic resin as set forth in claim 1; and
a thermally conductive filler.

9. The thermoplastic resin composition as set forth in claim 8, wherein
the thermally conductive filler is at least one highly thermally conductive inorganic compound selected from the group consisting of graphite, conductive metal powder, soft magnetic ferrite, carbon fiber, conductive metal fiber, zinc oxide, and carbon nanotube.

10. The thermoplastic resin composition as set forth in claim 8, wherein
the thermally conductive filler is an electrically insulative and highly thermally conductive inorganic compound itself having thermal conductivity of not less than 2.0 W/m·K.

11. The thermoplastic resin composition as set forth in claim 8, wherein
the thermally conductive filler is at least one highly thermally conductive inorganic compound selected from the group consisting of boron nitride, aluminum nitride, silicon nitride, aluminum oxide, magnesium oxide, magnesium carbonate, aluminum hydroxide, magnesium hydroxide, beryllium oxide, and diamond.

12. The thermoplastic resin composition as set forth in claim 8, wherein:
the thermally conductive filler is an inorganic nitride; and
thermal conductivity of the thermoplastic resin composition is not less than 2.0 W/m·K but not more than 50 W/m·K.

13. The thermoplastic resin composition as set forth in claim 9, wherein:
the thermally conductive filler is conductive carbon material; and
thermal conductivity of the thermoplastic resin composition is not less than 5.0 W/m·K but not more than 120 W/m·K.

* * * * *